US012786898B2

(12) United States Patent
Koskela et al.

(10) Patent No.: US 12,786,898 B2
(45) Date of Patent: Nov. 3, 2026

(54) POWER RAMPING PROCEDURE

(71) Applicant: Nokia Technologies Oy, Espoo (FI)

(72) Inventors: Timo Koskela, Oulu (FI); Sanjay Goyal, Denville, NJ (US)

(73) Assignee: Nokia Technologies Oy, Espoo (FI)

( * ) Notice: Subject to any disclaimer, the term of this patent is extended or adjusted under 35 U.S.C. 154(b) by 251 days.

(21) Appl. No.: 18/797,523

(22) Filed: Aug. 8, 2024

(65) Prior Publication Data

US 2025/0056427 A1 Feb. 13, 2025

Related U.S. Application Data

(60) Provisional application No. 63/518,837, filed on Aug. 10, 2023.

(51) Int. Cl.
*H04W 52/36* (2009.01)
*H04W 74/0833* (2024.01)

(52) U.S. Cl.
CPC ..... *H04W 52/367* (2013.01); *H04W 74/0833* (2013.01)

(58) Field of Classification Search
CPC ........... H04W 52/367; H04W 74/0833; H04W 52/325; H04W 52/50; H04W 52/04
See application file for complete search history.

(56) References Cited

U.S. PATENT DOCUMENTS

| | | | | |
|---|---|---|---|---|
| 12,082,115 | B2 * | 9/2024 | Terry | H04W 52/0235 |
| 12,127,270 | B2 * | 10/2024 | Rune | H04W 56/001 |
| 2019/0394805 | A1 * | 12/2019 | Kim | H04B 7/0404 |
| 2020/0112999 | A1 * | 4/2020 | Lee | H04B 7/2612 |
| 2024/0251444 | A1 * | 7/2024 | Takahashi | H04L 1/08 |
| 2024/0365398 | A1 * | 10/2024 | Mo | H04L 1/08 |

* cited by examiner

*Primary Examiner* — Michael A Keller
*Assistant Examiner* — Thao D Duong
(74) *Attorney, Agent, or Firm* — Barta Jones, PLLC

(57) ABSTRACT

Example embodiments of the present disclosure relate to methods, devices, apparatuses and computer readable storage medium for power ramping procedure. In a method, a first apparatus performs a first random access transmission with a transmission power determined based on a power ramping counter. The first random access transmission is associated with a first random access procedure initiated by a physical downlink control channel (PDCCH) order. The first apparatus stores a value of the power ramping counter.

20 Claims, 8 Drawing Sheets

POWER RAMPING PROCEDURE

FIELDS

Various example embodiments of the present disclosure generally relate to the field of telecommunication and in particular, to methods, devices, apparatuses and computer readable storage medium for power ramping procedure.

BACKGROUND

In some communication systems, mobility enhancements such as layer one (L1) or layer two (L2) based inter-cell mobility or lower layer triggered mobility (LTM) have been proposed. An objective for LTM is timing advance (TA) management in which the user equipment (UE) may be configured to obtain TA value or configured to perform procedure(s) for TA acquisition for at least one candidate target cell (also referred to as an LTM candidate) prior to the cell switch command that switched the UE to a new target cell.

The TA acquisition may be performed using physical downlink control channel (PDCCH) ordered random access procedure. Currently, in LTM, the PDCCH ordered random access procedure such as random access channel (RACH) procedure may be triggered for the UE where the target of the physical random access channel (PRACH) transmission is a candidate LTM cell. Furthermore, the PDCCH ordered RACH procedure may be configured so that no random access response (RAR) is provided by the network as response to the PRACH transmission. Works are ongoing regarding the power ramping for the PRACH.

SUMMARY

In a first aspect of the present disclosure, there is provided a first apparatus. The first apparatus comprises at least one processor; and at least one memory storing instructions that, when executed by the at least one processor, cause the first apparatus to: perform a first random access transmission with a transmission power determined based on a power ramping counter, the first random access transmission being associated with a first random access procedure initiated by a physical downlink control channel (PDCCH) order; and store a value of the power ramping counter.

In a second aspect of the present disclosure, there is provided a second apparatus. The second apparatus comprises at least one processor; and at least one memory storing instructions that, when executed by the at least one processor, cause the second apparatus to: transmit, to a first apparatus, a configuration for use of a stored value of a power ramping counter for determining a transmission power of a random access transmission, the random access transmission being associated with a random access procedure initiated by a physical downlink control channel (PDCCH) order.

In a third aspect of the present disclosure, there is provided a method. The method comprises: performing, at a first apparatus, a first random access transmission with a transmission power determined based on a power ramping counter, the first random access transmission being associated with a first random access procedure initiated by a physical downlink control channel (PDCCH) order; and storing a value of the power ramping counter.

In a fourth aspect of the present disclosure, there is provided a method. The method comprises: transmitting, at a second apparatus to a first apparatus, a configuration for use of a stored value of a power ramping counter for determining a transmission power of a random access transmission, the random access transmission being associated with a random access procedure initiated by a physical downlink control channel (PDCCH) order.

In a fifth aspect of the present disclosure, there is provided a first apparatus. The first apparatus comprises means for performing a first random access transmission with a transmission power determined based on a power ramping counter, the first random access transmission being associated with a first random access procedure initiated by a physical downlink control channel (PDCCH) order; and means for storing a value of the power ramping counter.

In a sixth aspect of the present disclosure, there is provided a second apparatus. The second apparatus comprises means for transmitting, to a first apparatus, a configuration for use of a stored value of a power ramping counter for determining a transmission power of a random access transmission, the random access transmission being associated with a random access procedure initiated by a physical downlink control channel (PDCCH) order.

In a seventh aspect of the present disclosure, there is provided a computer readable medium. The computer readable medium comprises instructions stored thereon for causing an apparatus to perform at least the method according to the third aspect or the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
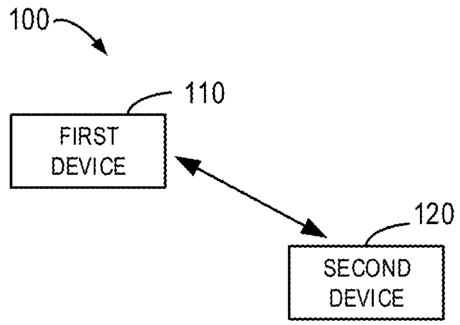
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio head (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As briefly mentioned, mobility enhancements such as layer L1/L2 based inter-cell mobility or LTM have been proposed. An objective for LTM is TA management in which the UE may be configured to obtain TA value or configured to perform procedures for acquiring TA for at least one candidate target cell (also referred to as an LTM candidate) prior to the cell switch command that switched the UE to a new target cell.

Several mechanisms and procedures for L1/L2 based inter-cell mobility for mobility latency reduction have been proposed. In some mechanisms, configuration and maintenance for multiple candidate cells are proposed to allow fast application of configurations for candidate cells. In addition, dynamic switch mechanism among candidate serving cells (including special cell (SpCell) and secondary cell (SCell)) for the potential applicable scenarios based on L1/L2 signalling is proposed.

In some mechanisms, L1 enhancements are intended for inter-cell beam management, including L1 measurement and reporting, and beam indication. It is to be noted that early radio access network 2 (RAN2) involvement is necessary, including the possibility of further clarifying the interaction. Moreover, timing advance (TA) management is proposed. In some mechanisms, centralized unit (CU)—distributed unit (DU) interface signaling may be used to support L1/L2 mobility, if needed. It is to be noted that frequency range 2 (FR2) specific enhancements may not be precluded, in any.

In some mechanism, the L1/L2 based inter-cell mobility may be applicable to various scenarios. An applicable scenario may be the standalone, carrier aggregation (CA) and new radio (NR)—dual connectivity (DC) case with serving cell change within one cell group (CG). Another applicable scenario may be the intra-DU case and intra-CU inter-DU case (applicable for Standalone and CA, and no new RAN interfaces are expected). The L1/L2 based inter-cell mobility may be applicable for both intra-frequency and inter-frequency, and for both FR1 and FR2. For the L1/L2 based inter-cell mobility, the source and target cells may be synchronized or non-synchronized.

In LTM, the decision about the cell change is based on L1 measurements and is made in the medium access control (MAC) layer in the DU. During the LTM, the TA acquisition may be performed using physical downlink control channel (PDCCH) ordered random access procedure. Several mechanisms are intended for the early TA acquisition of a candidate target cell for the L1/L2 triggered mobility (LTM).

In some mechanism, TA acquisition of candidate cell(s) before cell switch command is received in L1/L2 based mobility. Another mechanism to acquire TA of the candidate cell(s) in LTM is intended to at least support PDCCH ordered RACH. The PDCCH order may be only triggered by source cell.

Currently, in LTM, the PDCCH ordered random access procedure such as RACH procedure may be triggered for the UE where the target of the PRACH transmission is a candidate LTM cell.

In a further mechanism, the PDCCH order from the source cell contains the indication of candidate cell. The reserved bit(s) in downlink control information (DCI) format 1_0 for PDCCH order may be used for indication of cell identity. For PDCCH ordered-RACH for candidate cell(s), RAR reception may be configured/indicated. The DCI format ordering the PRACH transmission may further comprise of random access preamble index field (and index indicating the RA preamble that is used for the PRACH) and downlink reference signal index (e.g., synchronization signal block (SSB) index) that indicates the random access occasion for the PRACH transmission. In some examples the downlink reference signal (e.g., SSB index) that indicates the random access occasion may be referred as target DL RS (for the PRACH transmission). If reception of RAR is not configured/indicated (without RAR), TA value of candidate cell may be indicated in the cell switch command. Otherwise, if reception of RAR is configured/indicated, RAR contains at least TA of candidate cell. The maximum number of TA values memorized by UE is referred to as a UE capability.

Furthermore, the PDCCH ordered RACH procedure may be configured so that no random access response (RAR) is provided by the network as response to the PRACH transmission.

In a further mechanism, for PDCCH ordered-RACH, if reception of RAR is not configured, UE autonomous retransmission of PRACH is not allowed, regardless of the configuration of PreambleTransMax. If reception of RAR is configured, it is supported that RAR may be received from serving cell (in some examples at least in intra-DU case in some cases in inter-DU case). If reception of RAR is configured, it is supported that RAR is received from serving cell in inter-DU case. Alternatively, it may be configured that RAR is provided by the target cell (of the PRACH transmission).

In a further mechanism, for PDCCH ordered-RACH, if reception of RAR is not configured, whether power ramping is performed or not is determined from PDCCH order. To determine whether the power ramping is to be performed, The PDCCH order may explicitly indicate whether the PRACH is an initial transmission or retransmission. In addition, a power ramping-up value is configured. Otherwise, if power ramping is not performed, the power may be determined by open-loop power control.

In some mechanism, on the determination of the PRACH transmission power when reception of RAR is not configured. A one-bit field in PDCCH order may explicitly indicate initial transmission or retransmission of PRACH. For example, on the determination of the PRACH transmission power when reception of RAR is not configured, a [1-bit] field in PDCCH order explicitly indicating initial transmission or retransmission of PRACH is supported. UE will increase the power with the value of power ramping configuration if it is indicated as re-transmission, unless the max allowed power is achieved. However, whether/how to reset the counter needs to be specified.

In addition to TA, when reception of RAR is configured, RAN1 may discuss the following alternatives. A first alternative that when there is only one ongoing RACH procedure at each time, the identification of candidate cell is not needed. A second alternative that when more than one RACH procedures are allowed at each time, the identification of candidate cell is contained in RAR.

Therefore, the power ramping counter such as a power ramping preamble counter related to the LTM operation has become a concerning problem. In some mechanisms, the LTM RA procedure may be configured to operate without RAR response. However, the power ramping function may be still applied for the subsequent RA transmission triggered by the PDCCH order that includes retransmission (re-tx) flag (i.e., increment power). As an example, the (current) random access procedure may be considered to be (successfully) completed when the ordered PRACH transmission has been performed by the UE (and when no RAR response is configured). In a typical RA procedure (such as contention free random access (CFRA) or contention based random access (CBRA) that have RAR response) the start of a new procedure may cause the power ramping value to be reset, i.e., the power ramping starts from the initial value. However, in case of random access procedure without RAR response, determining the power ramping counter/value needs further consideration since the UE may initiate a new the random access procedure at any given time (due to UE internal reasons such as scheduling request/providing a buffer status report or beam failure recovery and so on).

While the UE may be triggered to transmit PRACH to an LTM candidate cell, there may be a UE initiated RA procedure on the serving cell such as a primary cell (PCell) (also referred to as scenario 1), for example, in case of beam failure recovery, or when UL synchronization status becomes "non-synchronized", or, scheduling request/provision of buffer status report, or another PDCCH ordered RA procedure for another LTM candidate cell. Since the UE maintains power ramping counter for LTM and a new RACH procedure is triggered with respect to the power ramping counter (that is a self-contained RA procedure), it is not clear how to determine the power ramping counter value for a PDCCH ordered RACH procedure that is triggered again (for the same target downlink reference signal/rach occasion). In one example problem setting, the counter is especially considered when the PDCCH ordered RACH is with an re-tx flag, after a UE initiated RACH procedure or PRACH transmission to another LTM candidate cell.

Similarly, when the UE is triggered to perform RACH-based LTM (RACH procedure after the cell switch command is received, also referred to as scenario 2) for an LTM target cell with which the UE has already performed one or more PRACH transmissions before the cell switch command is received, it is not clear how to determine the power ramping counter value for the PRACH transmission to be sent after the cell switch command is received.

In order to solve at least part of the above problems or other potential problems, a solution on power ramping procedure is proposed. According to example embodiments, a first apparatus (for example, a terminal device or UE) performs a first random access (RA) transmission with a transmission power determined based on a power ramping counter. The first random access transmission is associated with a first random access (RA) procedure initiated by a PDCCH order. For example, the first RA procedure may be an LTM procedure. The first RA transmission may be a triggered by the PDCCH order. The first apparatus may determine/may be configured to store a value of the power ramping counter. For example, the first apparatus may store the power ramping counter value used in the first RA procedure.

In this manner, the first apparatus can store a previously (or last) used power ramping counter value. This power ramping counter value can be used in following RA procedure or used for following RA transmission if needed (for the same target DL RS or same target candidate cell).

In some example embodiments, the network may configure whether or not the power ramping counter is stored. Configuration may be provided using radio resource control (RRC) signaling (or RRC plus MAC or RRC plus DCI). The UE may determine based on the on the configuration whether or not it stores the counter value (or resets the counter value). As an example, the reset may occur if there is a second RA procedure triggered after the first RA procedure (second being either PDDCH ordered RACH to another LTM candidate or UE initiated RA procedure or PDCCH ordered RA procedure with RAR) and there is a PDCCH order provided for the same target (target cell or target DL RS) as the first RA procedure. The first random access procedure may refer to at least one transmission of a PRACH preamble ordered by the PDCCH (for an RA procedure without RAR response) to an LTM candidate cell.

In some example embodiments, the UE may be configured to store the power ramping counter value for each candidate cell for which at least one PRACH transmission of a PDCCH ordered RA procedure has been performed. In some examples, whether the power ramping counter value is stored, may be configured per candidate cell or configured for all the candidate cells or configured as part of the random access configuration or configuration as part of the LTM configuration. In some examples, the DCI triggering the PDCCH ordered RA procedure may comprise of an indication whether the power ramping counter value is stored as described in some of the embodiments herein.

Example embodiments of the present disclosure will be described in detail below with reference to the accompanying drawings.

FIG. 1 illustrates an example communication environment 100 in which example embodiments of the present disclosure can be implemented. In the communication environment 100, a plurality of communication devices, including a first apparatus 110 and a second apparatus 120 can communicate with each other. In the communication environment 100, the second apparatus 120 may communicate data and control information to the first apparatus 110 and the first apparatus 110 may also communication data and control information to the second apparatus 120.

In some example embodiments, the second apparatus 120 may have one or more cells (not shown). The first apparatus 110 may be located in a certain coverage range of the cell of the second apparatus 120. The cell currently serving the first apparatus 110 may be referred to as a serving cell. The coverage range of the serving cell may be referred to as a serving range. The second apparatus 120 may provide one or more other cells than the serving cell. The cells not providing serving to the first apparatus 110 may be referred to as a candidate cell.

In some example embodiments, the first apparatus 110 may move from one location to another. In such cases, the serving cell for the first apparatus 110 may change. Alternatively, or in addition, in some scenarios, the serving cell may change under other situation or conditions. If the serving cell is to be switched from a first cell to a second cell, the first cell may be referred to as a "source cell", and the second cell may be referred to as a "target cell".

In some example embodiments, the second apparatus 120 may support a distributed architecture. For example, the second apparatus 120 may include a centralized unit (CU) and one or more distributed units (DUs). The CU may be configured to manage the DUs. If the current serving cell is provided by a first DU, the first DU may be referred to as a serving DU. If the serving cell needs to be switched from a first cell provided by a first DU to a second cell provided by a second DU, the first DU may be referred to as a "source DU", and the second DU may be referred to as a "target DU". The first and a second cell(s) may be provided by the same DU.

In some example embodiments, L1/L2 triggered mobility or LTM is supported by the first apparatus 110 and the second apparatus 120. For example, in the example embodiments where the second apparatus 120 includes the CU and DUs, the L1/L2 triggered mobility of LTM may be applied for the intra-CU inter-DU scenario. That is, intra-CU inter-DU LTM is supported.

It is to be understood that in some example embodiments, one or more cells may be provided by or associated with a single DU or a single CU. The serving cell may be a cell provided by the DU or the CU. The second apparatus 129 may include any suitable number of CU or DU, and the CU or DU may provide any suitable number of cells.

It is to be understood that the number of apparatuses and their connections shown in FIG. 1 are only for the purpose of illustration without suggesting any limitation. The communication environment 100 may include any suitable number of apparatuses configured to implementing example embodiments of the present disclosure.

In the following, for purpose of illustration, some example embodiments are described with the first apparatus 110 operating as a terminal device and the second apparatus 120 operating as a network device. However, in some example embodiments, operations described in connection with a terminal device may be implemented at a network device or other device, and operations described in connection with a network device may be implemented at a terminal device or other device.

In some example embodiments, if the first apparatus 110 is a terminal device and the second apparatus 120 is a network device, a link from the second apparatus 120 to the first apparatus 110 is referred to as a downlink (DL), while a link from the first apparatus 110 to the second apparatus 120 is referred to as an uplink (UL). In DL, the second apparatus 120 is a transmitting (TX) device (or a transmitter) and the first apparatus 110 is a receiving (RX) device (or a receiver). In UL, the first apparatus 110 is a TX device (or a transmitter) and the second apparatus 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2A:
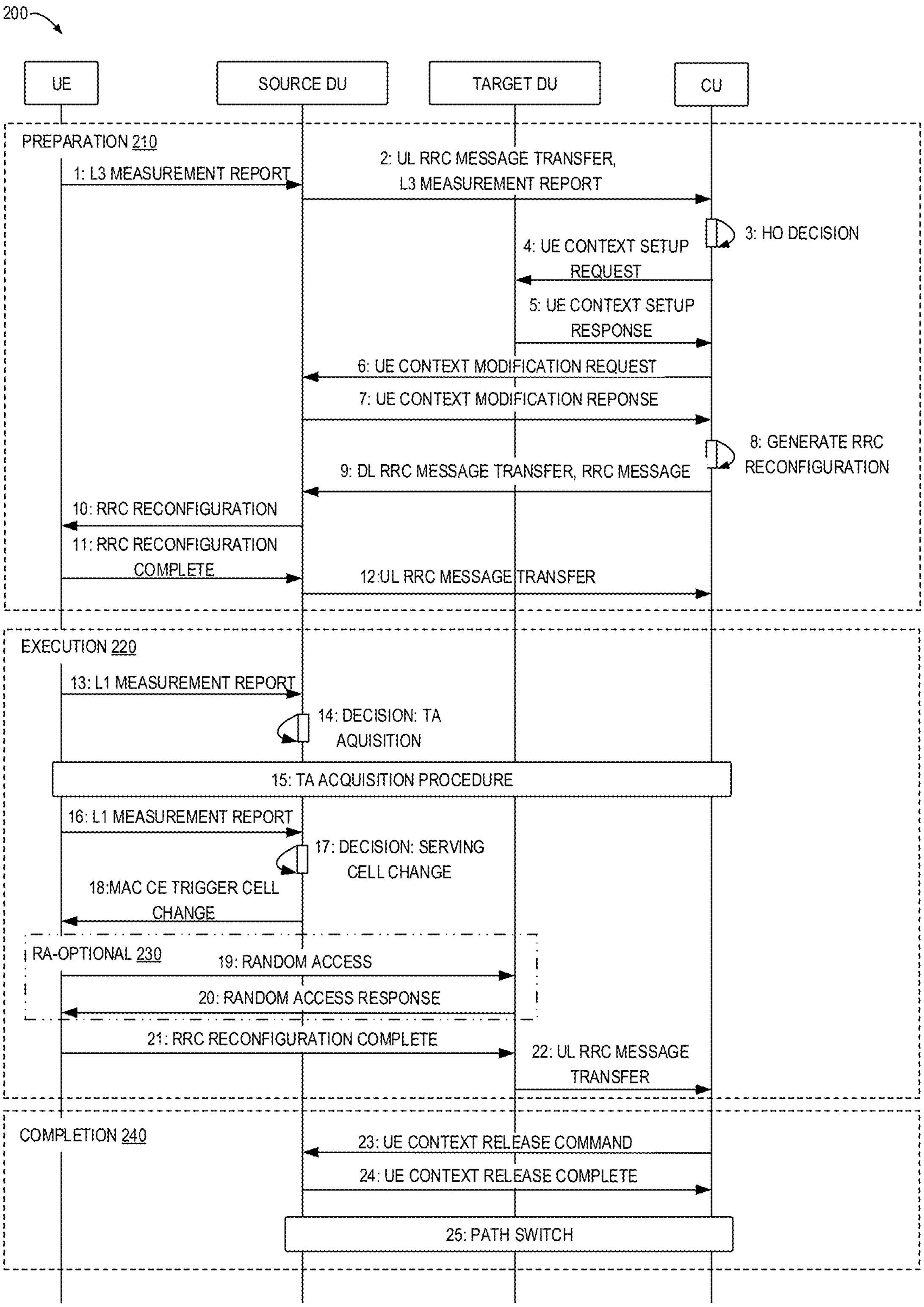
FIG. 2A illustrates a signaling chart for L1/L2 triggered mobility.

As mentioned, L1/L2 triggered mobility has been proposed. FIG. 2A illustrates a signaling chart 200 for the L1/L2 triggered mobility. Example message exchange for the intra-CU inter-DU LTM scenario captured for disaggregated architecture may be illustrated with respect to FIG. 2A. The signaling chart 200 may involve a UE, a source DU, a target DU and a CU. The signaling chart 200 may include a preparation stage 210, an execution stage 220 and a completion stage 240.

In the preparation stage 210, the UE provides the Layer 3 (L3) radio resource control (RRC) measurement event report to the source DU, which are forwarded to the CU (steps 1-2) via UL RRC message transfer. Based on the measurements included in the measurement report, the CU decides about the cell preparation (for example, handover (HO) Decision-step 3) and proceeds in setting up the UE context in the target DU (steps 4-5). CU communicates with the source DU for the modification of the UE context if needed and the provision of the target cell information (i.e., target cell Reference Signal (RS) configuration, Transmission Configuration Indicator (TCI) states, etc.) (steps 6-7).

In step 8, the CU creates and forwards the RRC Reconfiguration message to the source DU using a DL RRC Message Transfer and the latter forwards it to the UE (steps 9-10). UE responds with an RRC Reconfiguration Complete to the CU (steps 11-12).

In the execution stage 220, based on its configuration, the UE provides the periodic L1 reports to the source DU (step 13). Based on the received L1 measurement report, the source DU may trigger the UE, e.g., by sending a PDCCH order, to acquire TA for the set of candidate cells (i.e., candidate cells for the handover target cell) (step 14-15). Regarding the mechanism to acquire TA of the candidate cells, other solutions (in addition to RACH-based PDCCH order-based mechanism) like Rx timing difference based, RACH-less mechanism as in LTE, sounding reference signal (SRS) based TA acquisition are further studied. The source-DU/CU and candidate target-DUs/CUs coordinate on the TA acquisition method during LTM preparation phase (e.g., steps 4-5).

The UE continues L1 measurement reporting. Once the source DU decides that the UE should be handed over to a cell (i.e., target cell) of another DU (i.e., target DU) it triggers the cell switch, using a cell switch command (e.g., a MAC CE) (step 16-18).

Then the UE applies the RRC configuration for the target cell of target DU-indicated by the cell switch command (via MAC CE) and switches to the target DU. An optional RA procedure 230 may be performed. For example, the UE may be configured to perform RA to the target cell as shown in steps 19-20.

However, in other cases, the UE may be configured to not perform the RA to the target cell as it has already acquired the TA of the target cell. To initiate the communication with the target DU, the UE transmits an RRC Reconfiguration Complete using already configured UL resources to the target cell of target DU, which is forwarded to the CU-CP (steps 21-22).

In the completion stage 240, the CU releases the UE context from the source DU with a UE Context Release Request and performs Path Switch to the new DU (steps 23-25).

As illustrated in FIG. 2A, the TA acquisition is performed using PDCCH ordered RA procedure. In the LTM procedure with respect to FIG. 2A, a power ramping rule may be configured. For example, the MAC entity may con figure for each RA preamble. For example, the RA preamble transmission may be configured as Table 1 below.

TABLE 1

| |
|---|
| 1> if PREAMBLE_TRANSMISSION_COUNTER is greater than one; and |
| 1> if the notification of suspending power ramping counter has not been received from lower layers; and |
| 1> if listen before talk (LBT) failure indication was not received from lower layers for the last Random Access Preamble transmission; and |
| 1> if SSB or channel state information (CSI)-RS selected is not changed from the selection in the last Random Access Preamble transmission: |
| 2> increment PREAMBLE_POWER_RAMPING_COUNTER by 1. |
| 1> select the value of DELTA_PREAMBLE according to clause 7.3; |
| 1> set PREAMBLE_RECEIVED_TARGET_POWER to preambleReceivedTargetPower + DELTA_PREAMBLE + (PREAMBLE_POWER_RAMPING_COUNTER − 1) × PREAMBLE_POWER_RAMPING_STEP + POWER_OFFSET_2STEP_RA; |

However, such power ramping counter procedure may not applied for the LTM procedure in various scenarios. In a first scenario (also referred to as scenario 1), if the UE may be triggered to transmit PRACH to an LTM candidate cell, there may be a UE initiated RA procedure on the serving cell or other PDCCH order with RAR. Since the UE maintains/stores power ramping counter for LTM and a new RACH procedure is triggered with respect to the power ramping counter (that is a self-contained RA procedure), it is not clear how to determine the power ramping counter value for a RACH procedure triggered again for the same DL RS (and/or same cell). This is a concern especially with a PDCCH order with a re-tx flag, after a UE initiated RACH procedure or PRACH transmission to another LTM candidate cell or a PDCCH ordered RACH procedure with RAR (response).

Figure 2B:
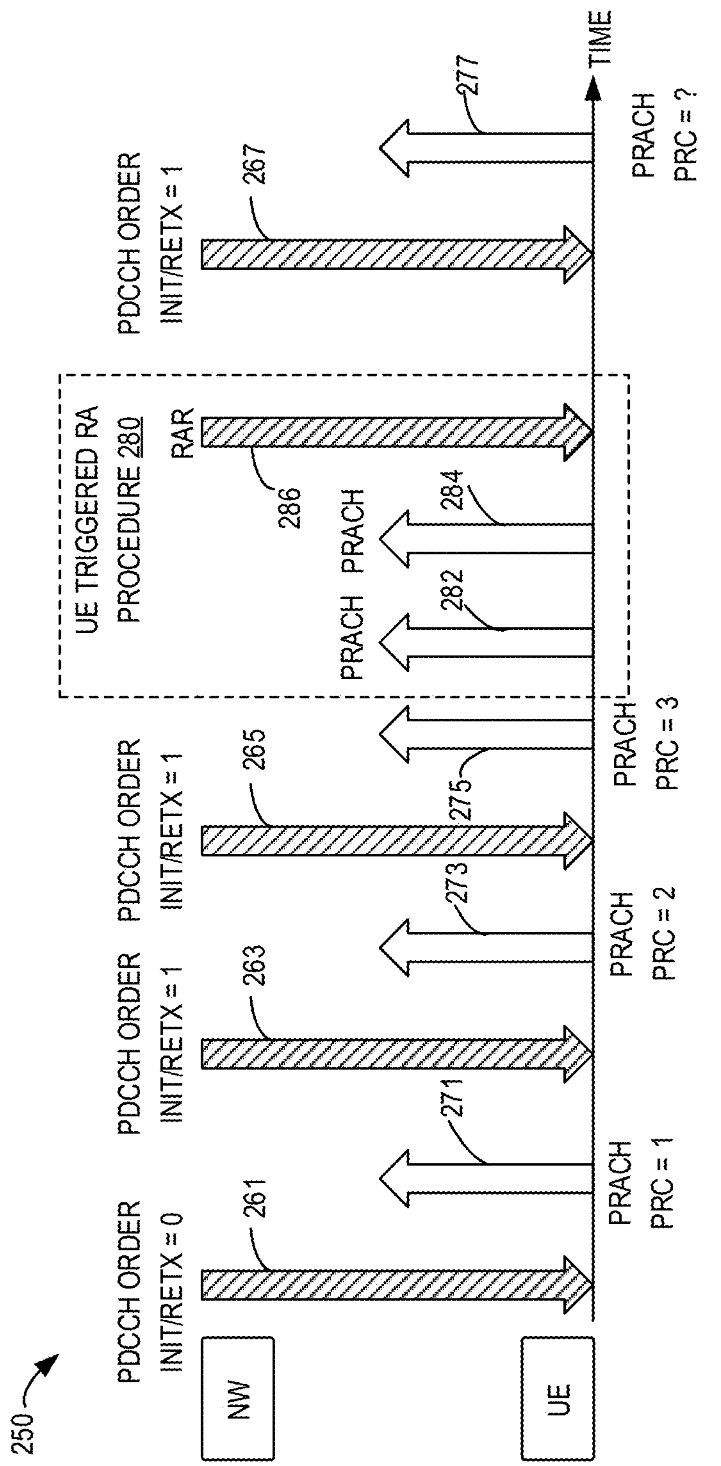
FIG. 2B illustrates an example diagram showing physical random access channel (PRACH) transmissions.

FIG. 2B illustrates an example diagram 250 showing PRACH transmissions. As illustrated, the network (NW) transmits a plurality of PDCCH orders 261, 263 and 265 to the UE. The UE is thus triggered to transmit PRACH 271, PRACH 273 and PRACH 275 in response to the PDCCH order 261, PDCCH order 263 and PDCCH order 265. For the PRACH 271, PRACH 273, and PRACH 275, the UE maintains the power ramping counter for LTM. However, a UE triggered RA procedure 280 may be performed. For example, one or more PRACH such as PRACH 282 and PRACH 284 may be transmitted during the UE triggered RA procedure 280. The NW may transmit a RAR 286 to the UE. In such situation, if a further PDCCH order 267 is transmitted to the UE, the UE is not clear about how to determine the power ramping counter value for the PRACH 277 triggered by the PDCCH order 267.

Similarly, in a second scenario (also referred to as scenario 2), if the UE is triggered to perform RACH-based LTM (RACH procedure after the cell switch command is received) for an LTM target cell with which the UE has already performed one or more PRACH transmissions before the cell switch command is received, it is not clear how to determine the power ramping counter value for the PRACH transmission to be sent after the cell switch command is received.

In order to solve at least part of the above problems or other potential problems, in some example embodiments, the first apparatus 110 stores a value of the power ramping counter used in an RA procedure triggered by a PDCCH order. For example, the first apparatus 110 performs an RA transmission with a transmission power determined based on the power ramping counter. The RA transmission is associated with the RA procedure initiated by the PDCCH order. The value of the power ramping counter used for the RA transmission is stored by the first apparatus 110.

In this manner, the first apparatus 110 can store a previously used power ramping counter value. This power ramping counter value can be used in following RA procedure or used for following RA transmission if needed e.g., when the first apparatus 110 receives a PDCCH order for RACH for the same target DL RS (or cell) for which it has performed previously at least one transmission. In some examples, the PDCCH order having a flag for initial transmission may cause the first apparatus 110 to reset the counter.

In one embodiment a timer may be configured to supervise or manager the maintenance or the stored value of the power ramping counter. The timer may be started when at least one PRACH transmission on a target DL RS has been made. Timer may be specific for a candidate cell or target DL RS (of a candidate cell). While the timer is running, the power ramping counter value is stored/maintained by the UE. In a further example, while the timer is running, the power ramping counter value is stored/maintained by the UE even in case of a second RA procedure (as described in some embodiments herein). Upon expiry of the timer, the power ramping counter value associated with the target DL RS or the cell is reset to default value when a new PDCCH order is triggered for the respective target DL RS or cell.

In one example embodiment, the power ramping counter for RA procedure without RAR may be considered to be reset (to the initial value), for the next RA procedure without RAR for the same target DL RS (or target cell) due to and after any of the following (any of the following considered as a second RA procedure): a UE initiated RA procedure is triggered (and completed), PDCCH order without RAR is triggered for another candidate cell (or DL RS) or PDCCH order with RAR is triggered. As an example, the first apparatus 110 may have been performed at least one PRACH transmission on a first random access procedure for LTM candidate cell (without RAR) ordered by PDCCH, and then performed a PRACH transmission due to triggering of a second random access procedure and it receives a PDCCH order with same or partially the same parameters (such as target DL RS) as the first RA procedure. In some examples, in this case, the default value for the counter is used (and value determined further by the DCI content of the PDCCH order). In other examples, the first apparatus 110 stores the value used in the first RA procedure and utilizes the stored value when first RA procedure is continued (e.g. same target DL RS/same cell is indicated by the PDCCH order).

In some example embodiment, when referring to an RA procedure without RAR, the RA procedure may comprise of one or more PRACH transmissions/RA procedures and may be completed after transmission but are considered as part of the same procedure when considering from the power ramping counter value perspective.

Figure 3:
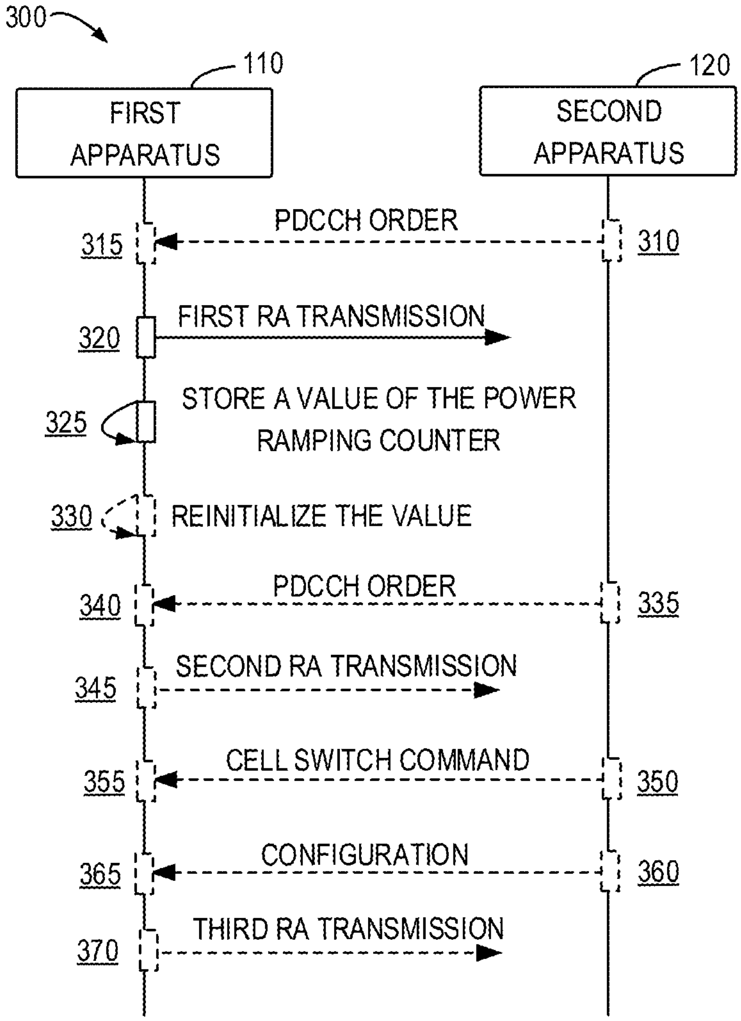
FIG. 3 illustrates an example signaling chart for power ramping procedure according to some example embodiments of the present disclosure.

FIG. 3 illustrates an example signaling chart 300 for power ramping procedure according to some example embodiments of the present disclosure. The signaling chart 300 involves the first apparatus 110 and the second apparatus 120 in FIG. 1. For purpose of illustration, the signaling chart 300 will be described by referring to FIG. 1.

Although a single first apparatus 110 and a single second apparatus 120 are illustrated in FIG. 3, it would be appreciated that there may be a plurality of apparatuses performing similar operations as described with respect to the first apparatus 110 or the second apparatus 120 below.

In operation, the first apparatus 110 performs (320) a first RA transmission with a transmission power determined based on a power ramping counter. The first RA transmission is associated with a first RA procedure initiated by a PDCCH order. For example, the second apparatus 120 may transmit (310) a PDCCH order (referred to as a first PDCCH order) to the first apparatus 110. In response to receiving (315) the PDCCH order, the first apparatus 110 performs (320) the first RA transmission. As used herein, the term "first RA procedure" may refer to the RA procedure triggered by the PDCCH order. For example, the first RA procedure may be an LTM procedure.

The first apparatus 110 stores (325) a value of the power ramping counter. For example, the first apparatus 110 stores (325) the value of the power ramping counter used in the first RA procedure. In some example embodiments, the power ramping counter is specific to an RA procedure without a RAR. The RA procedure is triggered by a PDCCH order. In some example embodiments, the power ramping counter may be a power ramping preamble counter. As used herein, the term "value of the power ramping counter" may also be referred to as "power ramping counter value" or "power ramping preamble counter value" or "preamble power ramping counter value".

In some example embodiments, the stored value of the power ramping counter is associated with a candidate cell. By way of example, the candidate cell may be a LTM candidate cell.

Alternatively, or in addition, the stored value of the power ramping counter may be associated with a target reference signal of the candidate cell. For example, the stored value of the power ramping counter may be associated with a target DL reference signal (RS) for the PDCCH order of the LTM candidate cell.

In some example embodiments, the RA transmission is performed to the candidate cell such as the LTM candidate cell (to a target DL RS). For example, the power ramping counter may be associated with the candidate cell (and/or target DL RS of the candidate cell). By way of example, the RA transmission may be an RA preamble transmission such as a PRACH preamble transmission.

In some example embodiments, the first apparatus 110 may be configured to maintain preamble power ramping counter that is specific for LTM PDCCH ordered RACH. For any PDCCH ordered RACH that is configured with no-RAR (i.e., no RAR is expected), the first apparatus 110 may maintain a specific counter for preamble power ramping. In some example embodiments, the power ramping counter for RA procedure with RAR and no-RAR may maintain separate states/values. Power ramping counter may be specific for a target DL RS (of a target cell) or a target cell.

If the first apparatus 110 receives a PDCCH order that requires no-RAR, the first apparatus 110 may use the preamble power ramping counter specific for no-RAR operation, for example, for LTM.

If any other RA procedure is initiated that requires RAR (that is, the first apparatus 110 expects response to the PRACH transmission), the counter used for RAR operation (e.g., contention based random access (CBRA) or contention free random access (CFRA) or PDCCH order for PCell or the like) may be used.

In example embodiments specific to an implementation of the first apparatus 110, the first apparatus 110 may maintain only one counter variable name in the MAC entity. The first apparatus 110 may store the most recent power ramping counter value used for LTM upon triggering (and initiating) a new RA procedure. If the PRACH for LTM is triggered the first apparatus, the first apparatus 110 may retrieve the stored value and applies it for the power ramping calculation.

The variable may be for example named as PREAMBLE_POWER_RAMPING_COUNTER_NORAR. In one option different counters for different candidate cells, one counter for each candidate cell for which the PRACH is triggered.

In some example embodiments, if the first apparatus 110 determines that a second RA procedure is to be initiated, the second RA procedure is not initiated by the PDCCH order, the first apparatus 110 may store (325) the value of the power ramping counter associated with the first RA procedure. For example, the first apparatus 110 may store (325) the value of the power ramping counter used for the first RA transmission. The second RA procedure is not initiated by the PDCCH order. For example, the RA procedure may be initiated by a MAC entity (e.g., CBRA for beam failure recovery or for provision of buffer status report/scheduling request). As used herein, the term "second RA procedure" may refer to an RA procedure not initiated by the PDCCH order (e.g., CBRA) or initiated by the PDCCH order with RAR.

In some example embodiments, if the first apparatus 110 has performed at least one PDCCH ordered RACH transmission (such as the first RA transmission) to an LTM candidate cell and determines to trigger the second random access procedure initiated by the first apparatus 110, the first apparatus 110 may be configured to store the power ramping counter value for the LTM PDCCH ordered RACH procedure.

In some example embodiments, if the first apparatus 110 perform the second RA procedure, the first apparatus 110 may reinitialize (330) the value of the power ramping counter. For example, the first apparatus 110 may reinitialize (330) the value of the power ramping counter to be a predefined or configured value, such as 1 or any other suitable value.

In some example embodiments, the second apparatus 120 may transmit (335) a PDCCH order (referred to as a second PDCCH order) to the first apparatus 110. The second PDCCH order indicates a second RA transmission. In response to receiving (340) the second PDCCH order, the first apparatus 110 may perform (345) a second RA transmission based on the stored value of the power ramping counter associated with the first random access procedure.

In some example embodiments, if the second RA transmission is indicated as an initial RA transmission (for example, with an "initial-Tx" flag), the first apparatus 110 may perform (345) the second RA transmission with the transmission power determined using the stored value of the power ramping counter.

Alternatively, or in addition, in some example embodiments, if the second RA transmission is indicated as a retransmission of the first RA transmission (for example, with an "re-Tx" flag), the first apparatus 110 may perform (345) the second RA transmission with the transmission power determined by using different options. For example, if the second PDCCH order is with a same target DL (that is, indicating retransmission) or with a "re-tx" flag, the first apparatus 110 may perform (345) the second RA transmission with the transmission power determined by using the following different options.

An example option may be that the first apparatus 110 performs (345) the second RA transmission using the stored value of the power ramping counter. That is, the transmission power of the second RA transmission is determined based on the stored value of the power ramping counter. The stored value may be a latest power ramping counter value for the LTM candidate cell.

In another option, the first apparatus 110 performs (345) the second RA transmission using a value of the power ramping counter generated by incrementing the stored value of the power ramping counter. For example, the transmission power of the second RA transmission may be determined by a value generated by incrementing the stored value by one or by any other suitable value.

In a further option, the first apparatus 110 may perform (345) the second RA transmission using a value of the power ramping counter generated by incrementing a default value of the power ramping counter. The default value may be predefined or configured. Alternatively, the first apparatus 110 may perform (345) the second RA transmission using the default value of the power ramping counter and may increment the default value after the second RA transmission.

In a still further option, the first apparatus 110 may perform (345) the second RA transmission using a reset value of the power ramping counter. For example, the value of the power ramping counter may be reset to a predefined or configured value, such as 1 or any other suitable value. The transmission power of the second RA transmission may be determined based on the reset value of the power ramping counter.

In some example embodiments, a configuration for use of a stored value of a power ramping counter for determining a transmission power of an RA transmission may be transmitted from the second apparatus 120 to the first apparatus 110. The configuration may indicate which option the first apparatus 110 may use to perform the second RA transmission. That is, the configuration may indicate which option the first apparatus 110 may use to determine the transmission power of the second RA transmission.

By way of example, the second apparatus 120 may indicate whether the first apparatus 110 may reset, increment, or use the same counter value for the RACH on LTM target cell. This behavior may also be indicated in the medium access control control element (MAC CE) that indicates the cell switch or in a DCI that schedules the MAC CE that triggers the cell switch.

It is to be understood that these above options for performing the second RA transmission are only for purpose of illustration, without suggesting any limitation. Any suitable option or rule may be applied for the second RA transmission. Scope of the present disclosure is not limited here.

In some example embodiments, the first apparatus 110 may apply any of the above options or any other suitable options, if the first apparatus 110 receives PDCCH ordered RACH for LTM while performing the RACH procedure initiated by the first apparatus 110, and if the first apparatus 110 determines to initiate PDCCH ordered RACH procedure (stopping the current procedure initiated by the first apparatus 110). In these cases, the first apparatus 110 applies the power ramping counter for the RACH procedure for the target cell.

In this way, the power ramping for the second RA transmission after the second RA procedure initiated by the UE can be determined. The second RA transmission thus can be transmitted with an appropriate transmission power (second or further transmission for new procedure after the second procedure). The number of retransmissions can be reduced accordingly. Further example embodiments regarding the second RA transmission triggered by the second PDCCH order will be described with respect to FIG. 4.

Alternatively, or in addition, in some example embodiments, the second apparatus 120 may transmit (350) a cell switch command to the first apparatus 110. The cell switch command indicates a switch based on an RA transmission. In response to receiving (355) the cell switch command, the first apparatus 110 may perform (370) a third RA transmission (of a new procedure) with a transmission power (determined by the basis of a stored value).

In some example embodiments, the first apparatus 110 is configured to store power ramping counter for one or more DL RS that are indicated as target RS for PDCCH ordered RACH for an LTM candidate cell and upon receiving (355) the cell switch command that triggers a RACH based LTM (i.e. the TA value is not provided or explicit RACH triggering is provided or other signaling that indicates that the first apparatus 110 shall to RACH based LTM). There are several options for the first apparatus 110 to perform (370) the RA transmission of a third RA procedure. In an example option, the first apparatus 110 may perform (370) the third RA transmission using the stored value of the power ramping counter. That is, the transmission power of the third RA transmission is determined based on the stored value of the power ramping counter. In some example embodiments, the first apparatus 110 may use the stored value of the power ramping counter and increment it by a predefined value for the next transmission.

That is, upon receiving (355) the cell switch command to an LTM target cell that indicates RACH based LTM switch, the first apparatus 110 may determine to use the last stored value of the power ramping counter for the RA preamble transmission. For example, if the first apparatus 110 selects the same target RS and the target cell for which at least one PRACH transmission has been performed, the first apparatus 110 may determine to use the last stored value of the power ramping counter for the RA preamble transmission. For another example, if the target cell is the same for which at least one PRACH transmission has been performed, the first apparatus 110 may determine to use the last stored value of the power ramping counter for the RA preamble transmission.

In another option, the first apparatus 110 may perform (370) the third RA transmission using a current value of the power ramping counter. For example, the transmission power of the third RA transmission may be determined by the current value of the power ramping counter. The current value is the value that was used for the latest transmission.

That is, upon receiving LTM command indicating RACH based LTM cell switch, the first apparatus 110 may apply the power ramping counter for the RACH procedure for the target cell by using one of the following: the stored counter value or the current power ramping counter value (of an RA procedure performed on the target cell before the LTM command).

In a further option, the first apparatus 110 may perform (370) the third RA transmission using a value of the power ramping counter generated by incrementing the stored value of the power ramping counter. For example, the transmission power of the third RA transmission may be determined by a value generated by incrementing the stored value by one or by any other suitable value.

In a still further option, the first apparatus 110 may perform (370) the third RA transmission using a reset value of the power ramping counter. That is, the first apparatus 110 may be configured to reset the initial value. For example, the value of the power ramping counter may be reset to a predefined or configured value, such as 1 or any other suitable value. The transmission power of the third RA transmission may be determined based on the reset value of the power ramping counter.

In some example embodiments, a configuration for use of a stored value of a power ramping counter for determining a transmission power of the third RA transmission may be transmitted (360) from the second apparatus 120 to the first apparatus 110. The first apparatus 110 may receive (365) the configuration.

In some example embodiments, the configuration may be configured per cell. For example, the configuration may be included in the LTM candidate cell configuration or any other suitable signaling.

By way of example, the second apparatus 120 may indicate whether the first apparatus 110 may reset, increment, or use the same counter value for the RACH on LTM target cell. This behavior may also be indicated in the MAC CE that indicates the cell switch or in a DCI that schedules the MAC CE that triggers the cell switch.

In some example embodiments, the configuration may be transmitted (360) together with the cell switch command. Alternatively, the configuration and the cell switch command may be transmitted separately. For example, the configuration may be transmitted (360) prior to the cell switch command, or after the cell switch command. In some example embodiments, the configuration may be transmitted prior to the second PDCCH order or after the PDCCH order. A same configuration may be transmitted for both the second RA transmission and the third RA transmission. Alternatively, different configurations may be configured for the second RA transmission and the third RA transmission.

The configuration may indicate which option the first apparatus 110 may use to may perform (370) the third RA transmission. That is, the configuration may indicate which option the first apparatus 110 may use to determine the transmission power of the third RA transmission.

Alternatively, or in addition, in some example embodiments, the first apparatus 110 may prioritize a random access resource having been transmitted for the first RA procedure/transmission. For example, the first apparatus 110 may be configured to apply prioritization of random access resources (e.g., CBRA) when selecting/performing RA based LTM cell switch upon LTM cell switch. By way of example, the first apparatus 110 may prioritize the downlink RS or RSs for which the first apparatus 110 has already performed at least one PDCCH ordered transmission.

It is to be understood that these above options for performing the third RA transmission are only for purpose of illustration, without suggesting any limitation. Any suitable option or rule may be applied for the third RA transmission. Scope of the present disclosure is not limited here.

In this way, the power ramping for the third RA transmission associated with the cell switch command can be determined. The third RA transmission thus can be transmitted with an appropriate transmission power. The number of retransmissions can be reduced accordingly. Further example embodiments regarding the second RA transmission triggered by the second PDCCH order will be described with respect to FIG. 5.

Advantages and/or benefits of the embodiments described herein may reduce the number of retransmission that the UE has to perform due to using stored value for the power ramping counter. As an example, the UE may be required to perform less RA transmission since it is able use already ramped power (due to stored value of the counter). Reducing the number of transmissions reduces the UE power consumption and causes less interference to the other UEs and network. Furthermore, it reduces the resource consumption due to less number of PDCCH orders triggered by the network which in turn provides more scheduling flexibility for the network and may reduce network energy consumption due less number of transmissions made.

Several example embodiments regarding performing the RA transmission based on the power ramping counter have been described. With the value of the power ramping counter, the power control for RA transmission such as UL power control for PRACH transmission can be achieved.

In some example embodiments, the first apparatus 110 may determine a transmission power $P_{PRACH,b,f,c}(i)$ for the RA transmission (such as the second RA transmission or the third RA transmission mentioned above) for the PRACH on active UL BWP b of carrier f of serving cell c based on DL RS for serving cell c in a transmission occasion i. An example determination may be (1):

$$P_{PRACH,b,f,c}(i)=\min\{P_{CMAX,f,c}(i),\ P_{PRACH,target,f,c}+PL_{b,f,c}\}\,[dBm] \tag{1}$$

where $P_{CMAX,f,c}(i)$ is the configured maximum output power for the first apparatus 110 which may be predefined or configured for carrier f of serving cell c within transmission occasion i, $P_{PRACH,target,f,c}$ is the PRACH target reception power PREAMBLE_RECEIVED_TARGET_POWER provided by higher layers for the active UL BWP b of carrier f of serving cell c, and $PL_{b,f,c}$ is a pathloss for the active UL BWP b of carrier f based on the DL RS associated with the PRACH transmission on the active DL BWP of serving cell c and calculated by the first apparatus 110 in dB as referenceSignalPower—higher layer filtered reference signal received power (RSRP) in dBm, where RSRP is predefined and the higher layer filter configuration is predefined. If the active DL BWP is the initial DL BWP and for synchronization signal (SS)/physical broadcast channel (PBCH) block and control resource set (CORESET) multiplexing pattern 2 or 3, as described, the first apparatus 110 determines $PL_{b,f,c}$ based on the SS/PBCH block associated with the PRACH transmission.

In some example embodiments, if a PRACH transmission from the first apparatus 110 is in response to a detection of a PDCCH order by the first apparatus 110 that triggers a contention-free random access procedure and depending on the DL RS that the DM-RS of the PDCCH order is quasi-collocated with as described, referenceSignalPower is provided by ss-PBCH-BlockPower.

Alternatively, or in addition, if within a random access response window, the first apparatus 110 does not receive a random access response that contains a preamble identifier corresponding to the preamble sequence transmitted by the first apparatus 110, the first apparatus 110 determines a transmission power for a subsequent PRACH transmission, if any.

If prior to a PRACH retransmission, the first apparatus 110 changes the spatial domain transmission filter, L1 notifies higher layers to suspend the power ramping counter.

In some example embodiments regarding the second RA transmission, the second RA transmission may be indicated as an initial transmission or a retransmission. Such indication may be included in downlink control information (DCI) such as DCI format 1_0. The DCI format 1_0 may be used for the scheduling of physical downlink shared channel (PDCSH) in a DL cell.

The following information may be transmitted by means of the DCI format 1_0 with cyclic redundancy check (CRC) scrambled by cell-radio network temporary identifier (C-RNTI) or configured scheduling radio network temporary identifiers (CS-RNTI) or modulation and coding scheme C-RNTI (MCS-C-RNTI): identifier for DCI formats-1 bits, the value of this bit field is always set to 1, indicating a DL DCI format, frequency domain resource $$\text{assignment} - \left\lceil \log_2\left(N_{RB}^{DL,BWP}\left(N_{RB}^{DL,BWP}+1\right)/2\right\rceil$$

bits where $$N_{RB}^{DL,BWP}$$

is predefined or configured.

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows. Random Access Preamble index –6 bits according to ra-PreambleIndex in the specifications. UL/supplementary uplink carrier (SUL) indicator –1 bit. If the value of the "Random Access Preamble index" is not all zeros and if the UE is configured with supplementaryUplink in ServingCellConfig in the cell, this field indicates which UL carrier in the cell to transmit the PRACH according to a predefined table; otherwise, this field is reserved. SS/PBCH index –6 bits. If the value of the "Random Access Preamble index" is not all zeros, this field indicates the SS/PBCH that shall be used to determine the RACH occasion for the PRACH transmission; otherwise, this field is reserved. PRACH Mask index –4 bits. If the value of the "Random Access Preamble index" is not all zeros, this field indicates the RACH occasion associated with the SS/PBCH indicated by "SS/PBCH index" for the PRACH transmission, according to the specifications; otherwise, this field is reserved. Cell indicator –x bits indicating the cell for the corresponding PRACH transmission if the first apparatus 110 is configured with higher layer parameter XYZ; 0 bit otherwise. PRACH retransmission indicator –1 bit indicating initial transmission or retransmission of PRACH according to a predefined table, if the first apparatus 110 is configured with higher layer parameter XYZ and the cell indicated by Cell indicator field is a candidate cell; this field is reserved if the first apparatus 110 is configured with higher layer parameter XYZ and the cell indicated by Cell indicator field is a serving cell but not a candidate cell; 0 bit otherwise. Reserved bits –12 bits for operation in a cell with shared spectrum channel access in frequency range 1 or when the DCI format is monitored in common search space for operation in a cell in frequency range 2-2; otherwise, 10 bits.

In some example embodiments, for example further in RAN1-112, for the PDCCH order contents, it was agreed that the PDCCH order from the source cell will contain the indication of candidate cell. The reserved bit(s) may be used for indication of cell identity.

In some example embodiments, the RA procedure may be specified as Table 2 below.

TABLE 2

| |
|---|
| When the Random Access procedure is initiated on a Serving Cell or to an LTM candidate cell, the MAC entity shall: |
| 1> flush the Msg3 buffer; |
| 1> flush the MSGA buffer; |
| 1> set the PREAMBLE_TRANSMISSION_COUNTER to 1; |
| 1> set the PREAMBLE_POWER_RAMPING_COUNTER to 1, if the Random Access procedure is not initiated by the PDCCH order for an LTM candidate cell as preamble re-transmission; |

In some example embodiments, the RA preamble transmission may be configured as Table 3 below.

TABLE 3

| |
|---|
| The MAC entity shall, for each Random Access Preamble: |
| 1> if PREAMBLE_TRANSMISSION_COUNTER is greater than one; and |
| 1> if the notification of suspending power ramping counter has not been received from lower layers; and |
| 1> if LBT failure indication was not received from lower layers for the last Random Access Preamble transmission; and |
| 1> if SSB or CSI-RS selected is not changed from the selection in the last Random Access Preamble transmission: |
| 2> increment PREAMBLE_POWER_RAMPING_COUNTER by 1. |
| 1> if the Random Access procedure is initiated by the PDCCH order for an LTM candidate cell as preamble re-transmission: |
| 2> increment PREAMBLE_POWER_RAMPING_COUNTER by 1. |

TABLE 3-continued

| |
|---|
| In some example embodiments, if needed, to be updated based on further RAN1 conclusion about power ramping details for PDCCH ordered-RACH, based on the 1-bit field in PDCCH order explicitly indicating initial transmission or retransmission of PRACH (currently assuming no parallel ongoing RA procedure for multiple candidate cells and for serving cells). |
| 1> select the value of DELTA_PREAMBLE according to clause 7.3; |
| 1> set PREAMBLE_RECEIVED_TARGET_POWER to preambleReceivedTargetPower + DELTA_PREAMBLE + (PREAMBLE_POWER_RAMPING_COUNTER − 1) × PREAMBLE_POWER_RAMPING_STEP + POWER_OFFSET_2STEP_RA; |
| 1> except for contention-free Random Access Preamble for beam failure recovery request and Random Access Preamble for an LTM candiate cell, compute the RA-RNTI associated with the PRACH occasion in which the Random Access Preamble is transmitted; |
| 1> instruct the physical layer to transmit the Random Access Preamble using the selected PRACH occasion, corresponding RA-RNTI (if available), PREAMBLE_INDEX, and PREAMBLE_RECEIVED_TARGET_POWER. |
| 1> if the Random Access Procedure is triggered by a PDCCH order for a LTM candidate cell: |
| 2> consider this Random Access procedure completed. |

Several example embodiments regarding storing and applying the value of the power ramping counter in different scenarios have been described with respect to FIG. 3. Further example embodiments regarding the power ramping procedure in scenario 1 (for example, for the second RA transmission mentioned above) will be described with respect to FIG. 4.

Figure 4:
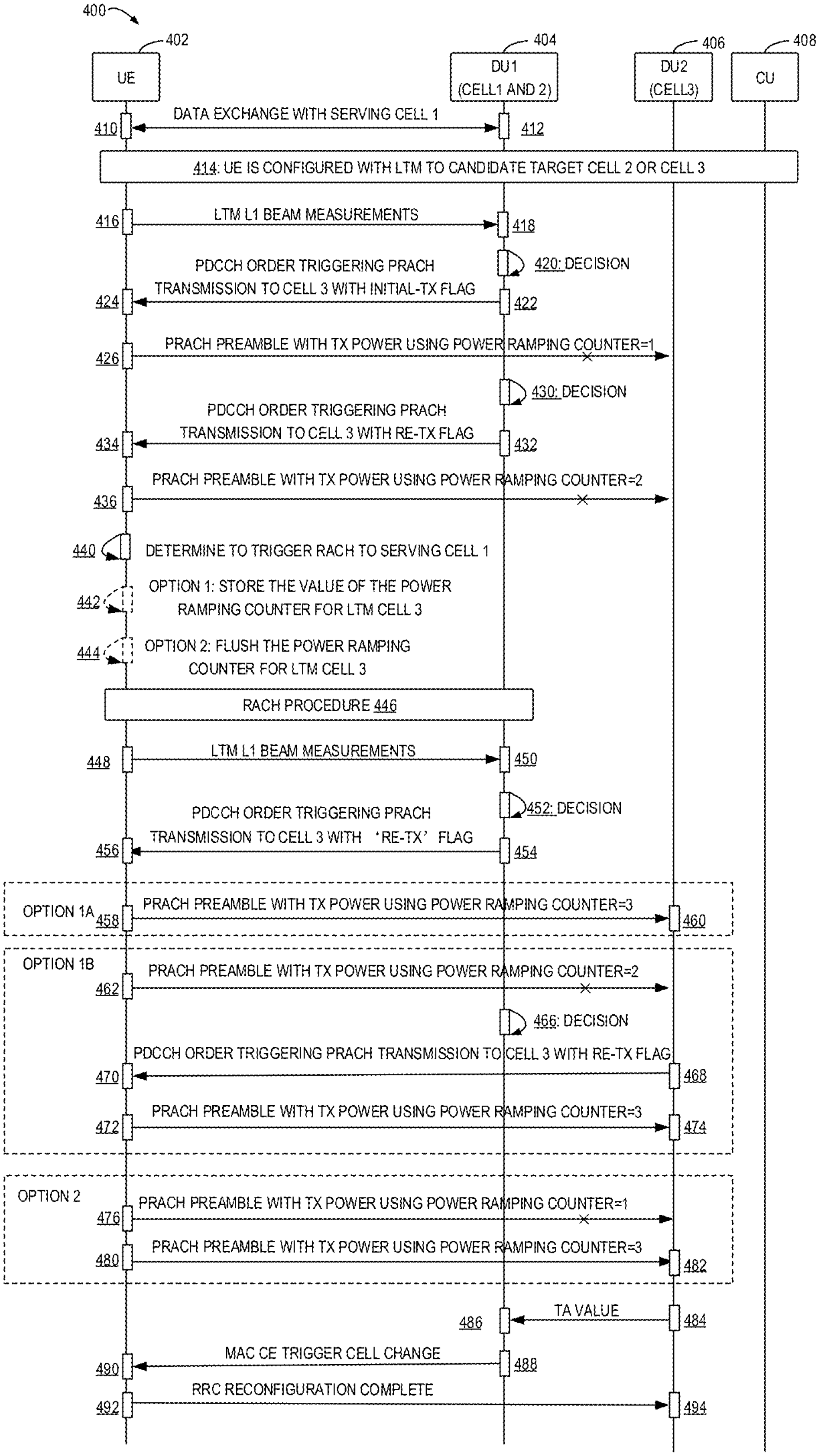
FIG. 4 illustrates another example signaling chart for power ramping procedure according to some example embodiments of the present disclosure.

FIG. 4 illustrates an example signaling chart 400 for power ramping procedure according to some example embodiments of the present disclosure. The signaling chart 400 involves UE 402 (such as the first apparatus 110 in FIG. 1), a DU 404, a DU 406 and a CU 408. The DU 404, DU 406 and CU 408 may be included in the second apparatus 120 in FIG. 1. The DU 404 may include a first cell (referred to as cell 1) and a second cell (referred to as cell 2). The DU 406 may include a third cell (referred to as cell 3).

In the description with respect to FIG. 4, it is assumed that the cell 1 is the serving cell. It is also assumed that the cell 2 is a target cell such as a LTM target cell, and the cell 3 is another target cell such as a LTM target cell. That is, the cell 2 or cell 3 may be candidate target LTM cell. In the description with respect to FIG. 4, the UE 402 may be configured PRACH power ramping for an LTM cell in the presence of another RACH procedure.

In operation, the UE 402 and the DU 404 may perform (410/412) data exchange with the serving cell (that is, cell 1). At block 414, the UE 402 is configured with LTM to candidate target cell 2 or cell 3.

In some example embodiments, the UE 402 may transmit (416) an LTM L1 beam measurements to the DU 404. The DU 404 may receive (418) the LTM L1 beam measurements. The DU 404 may decide (420) of a TA acquisition for the cell 3.

The DU 404 may transmit (422), to the UE 402, a PDCCH order triggering PRACH transmission to cell 3 with initial-Tx flag. The UE 402 may receive (424) the PDCCH order. In response to receiving (424) the PDCCH order, the UE 402 may transmit (426) PRACH preamble with Tx power using power ramping counter equal to 1. The PRACH preamble may fail to be received by the DU 406.

In some example embodiments, the DU 404 may further decide (430) of the TA acquisition for the cell 3 with power ramping. The DU 404 may transmit (432), to the UE 402, a PDCCH order triggering PRACH transmission to cell 3 with re-Tx flag. The UE 402 may receive (434) the PDCCH order. In response to receiving (434) the PDCCH order, the UE 402 may transmit (436) PRACH preamble with Tx power using power ramping counter equal to 2. The PRACH preamble may fail to be received by the DU 406.

The UE 402 may determine (440) to trigger RACH to the serving cell 1, for example, due to beam failure recovery (BFR) or any other situations. In one option, the UE 402 may store (442) the value of the Power ramping counter for LTM cell 3. In another option, the UE 402 may flush (444) the power ramping counter for LTM cell 3. The RA procedure triggered by the UE 402 may be performed (446). By way of example, the RA procedure may be a 4-step procedure.

In such cases, the PRACH procedure triggered for LTM cell 3 has one or more retransmissions, i.e., the last power ramping counter is equal to 2 in this example. Meanwhile another RACH procedure is triggered. For example, the other RACH procedure may be triggered by UE 402 at the serving cell (for example, cell 1) or may be PDCCH ordered PRACH for another LTM candidate cell, for example cell 4 (not shown).

The UE 402 may transmit (448) LTM L1 beam measurements to the DU 404. The DU 404 may receive (450) the LTML1 beam measurements. The DU 404 may decide (452) of the TA acquisition for the cell 3 with power ramping. The DU 404 may transmit (454), to the UE 402, a PDCCH order triggering PRACH transmission to cell 3 with re-Tx flag. The UE 402 may receive (456) the PDCCH order. That is, the UE 402 receives further PDCCH ordered RACH for the LTM cell 3. In some example embodiments, the UE 402 may be configured to store the latest power ramping counter for the LTM cell 3, for example, 2 in the illustrated case.

In response to receiving (456) the PDCCH order, these are several options for the UE 402. In a first option (referred to as option 1A), the UE 402 may transmit (458) PRACH Preamble with Tx power using Power Ramping Counter equal to 3 to the DU 406. The DU 406 may receive (460) the PRACH preamble. It is to be understood that in some example embodiments, the DU 406 may fail to receive the PRACH preamble.

In a second option (referred to as option 1B), the UE 402 may transmit (462) PRACH Preamble with Tx power using Power Ramping Counter equal to 2 to the DU 406. In some cases, the DU 406 may fail to receive the PRACH preamble. The DU 404 may decide (466) of the TA acquisition for the cell 3 with power ramping. The DU 404 may transmit (468), to the UE 402, a PDCCH order triggering PRACH transmission to cell 3 with re-Tx flag. The UE 402 may receive (470) the PDCCH order. In response to receiving (470) the PDCCH order, the UE 402 may transmit (472) PRACH Preamble with Tx power using Power Ramping Counter equal to 3 to the DU 406. In some example embodiments, the DU 406 may receive (474) the PRACH preamble.

In a third option (referred to as option 2), the UE 402 may transmit (476) PRACH Preamble with Tx power using Power Ramping Counter equal to 1 to the DU 406. In some cases, the DU 406 may fail to receive the PRACH preamble. The UE 402 than may transmit more PRACH preamble with different Tx power to the DU 406. For example, the UE 402 may transmit (480) PRACH Preamble with Tx power using Power Ramping Counter equal to 3 to the DU 406. In some cases, the DU 406 may receive (482) the PRACH preamble.

In some example embodiments, in response to receiving the PRACH preamble, the DU 406 may transmit (484) a TA value to the DU 404. The DU 404 may receive (486) the TA value.

In response to receiving (486) the TA value, the DU 404 may transmit (488) a MAC CE trigger for cell change to the UE 402. The UE 402 may receive (490) the MAC CE trigger. The MAC CE trigger may indicate the cell 3 and the TA value.

The UE 402 may transmit (492) a RRC reconfiguration complete message to the DU 406. The DU 406 may receive (494) the message.

Figure 5:
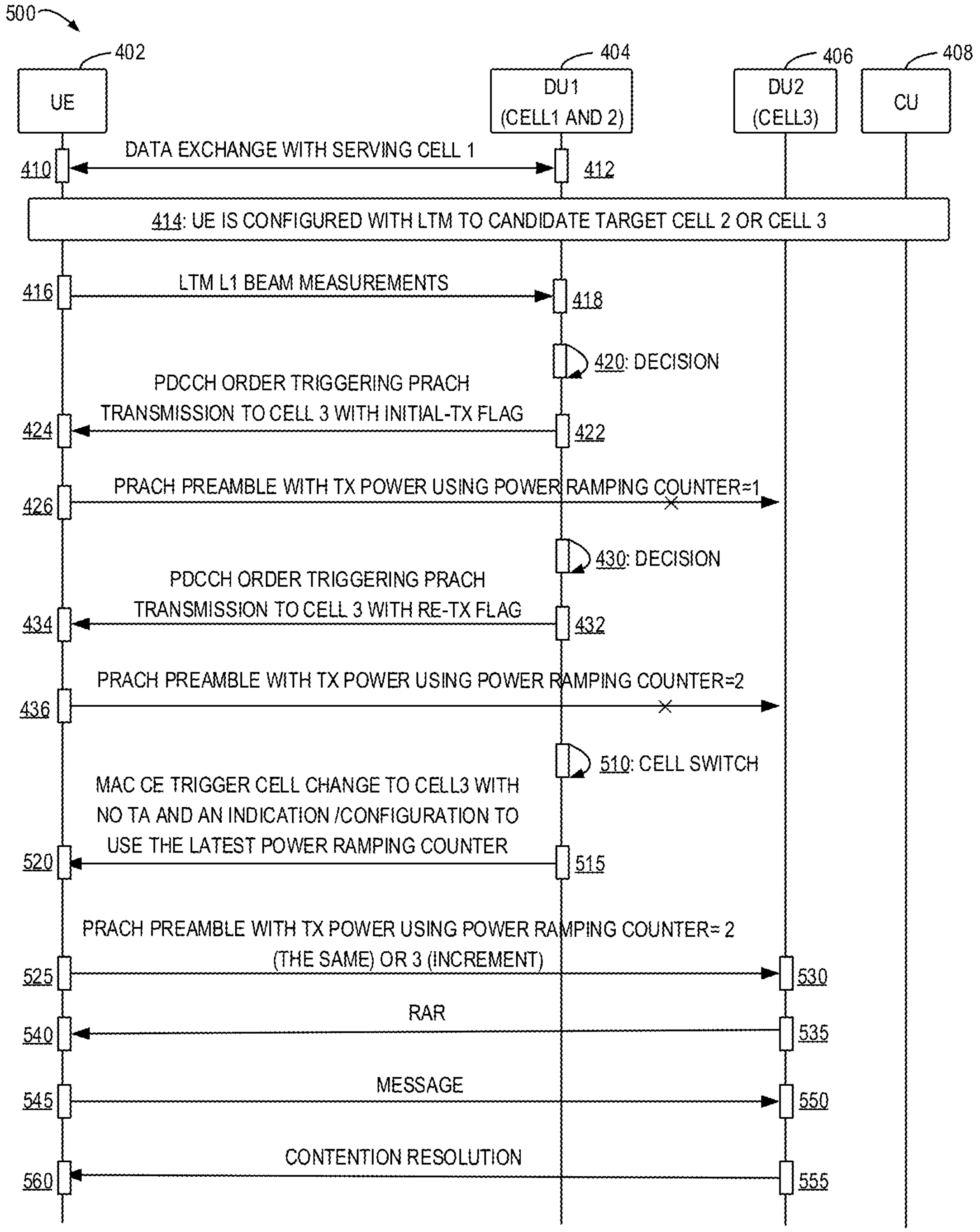
FIG. 5 illustrates another example signaling chart for power ramping procedure according to some example embodiments of the present disclosure.

FIG. 5 illustrates another example signaling chart 500 for power ramping procedure according to some example embodiments of the present disclosure. Similar to the signaling chart 400, the signaling chart 500 involves the UE 402 (such as the first apparatus 110 in FIG. 1), the DU 404, the DU 406 and the CU 408. The DU 404, DU 406 and CU 408 may be included in the second apparatus 120 in FIG. 1. The DU 404 may include a first cell (referred to as cell 1) and a second cell (referred to as cell 2). The DU 406 may include a third cell (referred to as cell 3).

In the description with respect to FIG. 5, it is assumed that the cell 1 is the serving cell. It is also assumed that the cell 2 is a target cell such as a LTM target cell, and the cell 3 is another target cell such as a LTM target cell. That is, the cell 2 or cell 3 may be candidate target LTM cell. In the description with respect to FIG. 4, the UE 402 may be configured PRACH power ramping for an LTM cell in the presence of another RACH procedure.

Similar to the signaling chart 400, in operation, the UE 402 and the DU 404 may perform (410/412) data exchange with the serving cell (that is, cell 1). At block 414, the UE 402 is configured with LTM to candidate target cell 2 or cell 3.

In some example embodiments, the UE 402 may transmit (416) an LTM L1 beam measurements to the DU 404. The DU 404 may receive (418) the LTM L1 beam measurements. The DU 404 may decide (420) of a TA acquisition for the cell 3.

The DU 404 may transmit (422), to the UE 402, a PDCCH order triggering PRACH transmission to cell 3 with initial-Tx flag. The UE 402 may receive (424) the PDCCH order. In response to receiving (424) the PDCCH order, the UE 402 may transmit (426) PRACH preamble with Tx power using power ramping counter equal to 1. The PRACH preamble may fail to be received by the DU 406.

In some example embodiments, the DU 404 may further decide (430) of the TA acquisition for the cell 3 with power ramping. The DU 404 may transmit (432), to the UE 402, a PDCCH order triggering PRACH transmission to cell 3 with re-Tx flag. The UE 402 may receive (434) the PDCCH order. In response to receiving (434) the PDCCH order, the UE 402 may transmit (436) PRACH preamble with Tx power using power ramping counter equal to 2. The PRACH preamble may fail to be received by the DU 406.

In some example embodiments, in case that the UE 402 has performed PDCCH ordered RACH for the LTM cell 3 before the cell switch, with e.g., initial transmission and/or N retransmissions transmission that may have failed (e.g., power ramping counter reaches to 2 in this example), the DU 404 may trigger (510) a cell switch.

By way of example, due to the time constraint, the serving cell (for example, the DU 404) decides to trigger cell switch with RACH-based LTM but now it asks the UE 402 to use the latest power ramping counter (=2), e.g., the same value or with an increment, to determine the PRACH tx power for the PRACH procedure after the cell switch command instead of resetting the counter value to an initial value.

The DU 404 may transmit (515), to the UE 402, a MAC CE trigger cell change to cell 3 with no TA and an indication/configuration to use the latest power ramping counter. In response to receiving (520) the MAC CE trigger cell change, the UE 402 may transmit (525) a PRACH Preamble with Tx power using Power Ramping Counter equal to 2 (the same) or 3 (increment) to the DU 406. The DU 406 may receive (530) the PRACH preamble.

In some example embodiments, in response to receiving (530) the PRACH preamble, the DU 406 may transmit (535) a RAR to the UE 402. The UE 402 may receive (540) the RAR. In response to receiving (540) the RAR, the UE 402 may transmit (545) a message to the DU 406. In response to receiving (550) the message, the DU 406 may transmit (555) a contention resolution to the UE 402. The UE 402 may receive (560) the contention resolution.

Example embodiments of power ramping procedure have been described with respect to FIG. 3 and FIG. 5. In some example embodiments, embodiments described with reference to the above signaling chart 300, signaling chart 400 and signaling chart 500 may be used separately, or in any suitable combination.

By using these signaling charts 300, 400 and/or 400, the power ramping procedure especially the power ramping for LTM procedure can be enhanced. Accordingly, the performance of the sensing in the ISAC can be improved.

Specifically, by storing the value of the power ramping counter by the first apparatus 110 or the UE 402, when a PDCCH ordered RA procedure (referred to as a first RA procedure) for a LTM cell is interrupted by another RA procedure, the first apparatus 110 or UE 402 can be able to continue the first RA procedure based on the stored value of the power ramping counter. In this way, the transmission power of the RA transmission can be set appropriately. The number of retransmissions can thus be reduced. For example, a minimum number of retransmissions can be achieved.

It would be appreciated that some example specifications and embodiments are provided above, and the detailed description may be varied.

Figure 6:
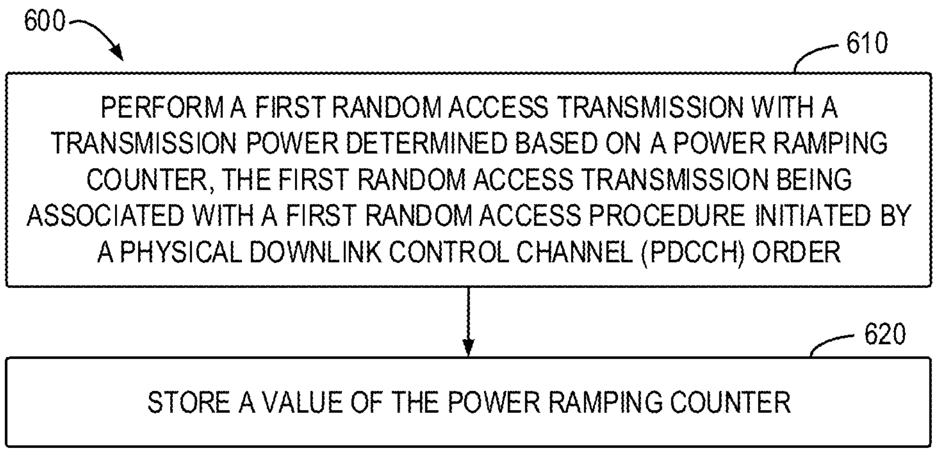
FIG. 6 illustrates a flowchart of a method implemented at a first apparatus according to some example embodiments of the present disclosure.

FIG. 6 shows a flowchart of an example method 600 implemented at a first apparatus in accordance with some example embodiments of the present disclosure. For the purpose of discussion, the method 600 will be described from the perspective of the first apparatus 110 in FIG. 1.

At block 610, the first apparatus 110 performs a first random access transmission with a transmission power determined based on a power ramping counter. The first random access transmission being associated with a first random access procedure initiated by a PDCCH order.

At block 620, the first apparatus 110 stores a value of the power ramping counter.

In some example embodiments, the method 600 further comprises: in accordance with a determination that a second random access procedure is to be initiated, storing the value of the power ramping counter associated with the first random access procedure. The second random access procedure is not initiated by the PDCCH order, or the second random access procedure is initiated by a medium access control (MAC) entity or initiated by the PDCCH order.

In some example embodiments, the method 600 further comprises: in response to performing the second random access procedure, reinitializing the value of the power ramping counter.

In some example embodiments, the method 600 further comprises: receiving a PDCCH order indicating a second random access transmission; and performing the second random access transmission using a transmission power determined based on the stored value of the power ramping counter associated with the first random access procedure.

In some example embodiments, the method 600 further comprises: in response to the second random access transmission being indicated as an initial random access transmission, performing the second random access transmission with the transmission power determined using the stored value of the power ramping counter associated with the first random access procedure.

In some example embodiments, the method 600 further comprises: in response to the second random access transmission being indicated as a retransmission of the first random access transmission, performing the second random access transmission with the transmission power determined using one of: the stored value of the power ramping counter associated with the first random access procedure, a value of the power ramping counter generated by incrementing the stored value of the power ramping counter, a value of the power ramping counter generated by incrementing a default value of the power ramping counter associated with the first random access procedure, or a reset value of the power ramping counter.

In some example embodiments, the second random access transmission comprises a PDCCH ordered random access transmission without a random access response to a target reference signal or a candidate cell. The second random access transmission is subsequent to at least one random access transmission without a random access response to the target reference signal or the candidate cell performed in the first random access procedure.

In some example embodiments, the method 600 further comprises: receiving a cell switch command indicating a switch based on a random access transmission; and performing a random access transmission with a transmission power determined using one of: the stored value of the power ramping counter associated with the first random access procedure, a current value of the power ramping counter, a value of the power ramping counter generated by incrementing the stored value of the power ramping counter associated with the first random access procedure, or a reset value of the power ramping counter.

In some example embodiments, the stored value of the power ramping counter is associated with at least one of a candidate cell or a target reference signal of the candidate cell, wherein the random access transmission is performed to the candidate cell.

In some example embodiments, the power ramping counter is specific to a random access procedure without a random access response, the random access procedure being triggered by a PDCCH order.

In some example embodiments, the power ramping counter is associated with a candidate cell.

In some example embodiments, the power ramping counter is associated with a downlink reference signal of the candidate cell.

In some example embodiments, the method 600 further comprises: prioritizing a random access resource having been for the first random access transmission.

In some example embodiments, the method 600 further comprises: receiving, from a second apparatus, a configuration for use of the stored value of the power ramping counter.

Figure 7:
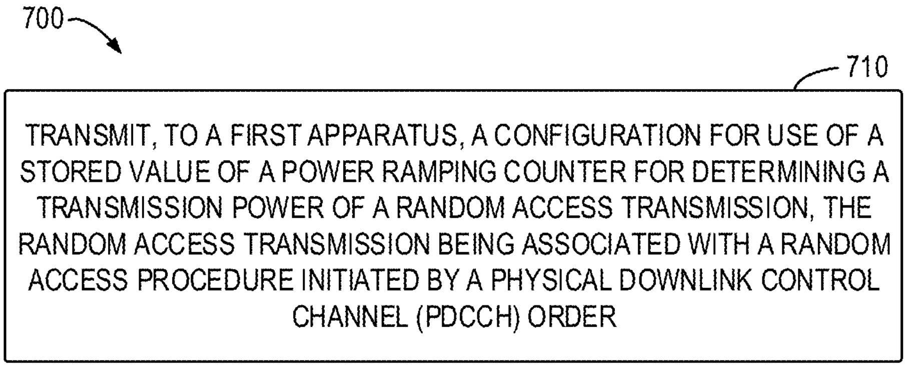
FIG. 7 illustrates a flowchart of a method implemented at a second apparatus according to some example embodiments of the present disclosure.

FIG. 7 shows a flowchart of an example method 700 implemented at a second apparatus in accordance with some example embodiments of the present disclosure. For the purpose of discussion, the method 700 will be described from the perspective of the second apparatus 120 in FIG. 1.

At block 710, the second apparatus 120 transmits, to a first apparatus, a configuration for use of a stored value of a power ramping counter for determining a transmission power of a random access transmission. The random access transmission being associated with a random access procedure initiated by a PDCCH order.

In some example embodiments, a first apparatus capable of performing any of the method 600 (for example, the first apparatus 110 in FIG. 1) may comprise means for performing the respective operations of the method 600. The means may be implemented in any suitable form. For example, the means may be implemented in a circuitry or software module. The first apparatus may be implemented as or included in the first apparatus 110 in FIG. 1.

In some example embodiments, the first apparatus comprises means for performing a first random access transmission with a transmission power determined based on a power ramping counter, the first random access transmission being associated with a first random access procedure initiated by a physical downlink control channel (PDCCH) order; and means for storing a value of the power ramping counter.

In some example embodiments, the first apparatus further comprises: in accordance with a determination that a second random access procedure is to be initiated, storing the value of the power ramping counter associated with the first random access procedure. The second random access procedure is not initiated by the PDCCH order, or the second random access procedure is initiated by a medium access control (MAC) entity or initiated by the PDCCH order.

In some example embodiments, the first apparatus further comprises: means for in response to performing the second random access procedure, reinitializing the value of the power ramping counter.

In some example embodiments, the first apparatus further comprises: means for receiving a PDCCH order indicating a second random access transmission; and means for performing the second random access transmission using a transmission power determined based on the stored value of the power ramping counter associated with the first random access procedure.

In some example embodiments, the first apparatus further comprises: means for receiving a PDCCH order indicating a second random access transmission without RAR; and means for performing the second random access transmission using a transmission power determined based on the stored value of the power ramping counter associated with the first random access procedure.

In some example embodiments, the first apparatus further comprises: means for receiving a PDCCH order indicating a random access transmission without RAR; and means for performing the random access transmission using a transmission power determined based on the stored value of the power ramping counter associated with the first random access procedure.

In some example embodiments, the first apparatus further comprises: means for receiving a PDCCH order for a random access procedure indicating random access transmission without RAR; and means for performing the random access transmission using a transmission power determined based on the stored value of the power ramping counter associated with the first random access procedure.

In some example embodiments, the first apparatus further comprises: means for receiving a PDCCH order for a random access procedure indicating random access transmission without RAR; and means for performing the random access transmission using a transmission power determined based on the stored value of the power ramping counter associated with a previous random access procedure associated with same target downlink reference signal or a cell.

In some example embodiments, the first apparatus further comprises: means for in response to the second random access transmission being indicated as an initial random access transmission, performing the second random access transmission with the transmission power determined using the stored value of the power ramping counter associated with the first random access procedure.

In some example embodiments, the first apparatus further comprises: means for in response to the second random access transmission being indicated as a retransmission of the first random access transmission, performing the second random access transmission with the transmission power determined using one of: the stored value of the power ramping counter associated with the first random access procedure, a value of the power ramping counter generated by incrementing the stored value of the power ramping counter, a value of the power ramping counter generated by incrementing a default value of the power ramping counter associated with the first random access procedure, or a reset value of the power ramping counter.

In some example embodiments, second random access transmission may refer to a subsequent PDCCH ordered random access transmission (without RAR) to target downlink reference signal (or a cell) for which the first apparatus has made at least one PDCCH ordered random access transmission (without RAR) previously.

In some example embodiments, second random access transmission may refer to a subsequent PDCCH ordered random access transmission (without RAR) to target downlink reference signal associated with a candidate cell for which the first apparatus has made at least one PDCCH ordered random access transmission (without RAR).

In some example embodiments, second random access transmission may refer to a subsequent PDCCH ordered random access transmission without RAR to target downlink reference signal or a target cell for which the first apparatus has performed at least one PDCCH ordered random access transmission without RAR.

In some example embodiments, second random access transmission may refer to a subsequent PDCCH ordered random access transmission without RAR of a new random access procedure to target downlink reference signal or a cell (for which the first apparatus has performed at least one PDCCH ordered random access transmission without RAR).

In some example embodiments, second random access transmission refers to a subsequent PDCCH ordered random access transmission without RAR to target downlink reference signal or a target cell for which the first apparatus has performed at least one PDCCH ordered random access transmission without RAR in first random access procedure.

In some example embodiments, the first apparatus further comprises: means for receiving a cell switch command indicating a switch based on a random access transmission; and means for performing a random access transmission indicated by the cell switch command with a transmission power determined using one of: the stored value of the power ramping counter associated with the first random access procedure, a current value of the power ramping counter, a value of the power ramping counter generated by incrementing the stored value of the power ramping counter associated with the first random access procedure, or a reset value of the power ramping counter.

In some example embodiments, the stored value of the power ramping counter is associated with at least one of a candidate cell or a target reference signal of the candidate cell, wherein the random access transmission is performed to the candidate cell.

In some example embodiments, the power ramping counter is specific to a random access procedure without a random access response, the random access procedure being triggered by a PDCCH order.

In some example embodiments, the power ramping counter is associated with a candidate cell.

In some example embodiments, the power ramping counter is associated with a downlink reference signal of the candidate cell.

In some example embodiments, the first apparatus further comprises: means for prioritizing a random access resource having been for the first random access transmission.

In some example embodiments, the first apparatus further comprises: means for receiving, from a second apparatus, a configuration for use of the stored value of the power ramping counter.

In some example embodiments, the first apparatus further comprises means for performing other operations in some example embodiments of the method 600 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 700 (for example, the second apparatus 120 in FIG. 1) may comprise means for performing the respective operations of the method 700. The means may be implemented in any suitable form. For example, the means may be implemented in a circuitry or software module. The second apparatus may be implemented as or included in the second apparatus 120 in FIG. 1.

In some example embodiments, the second apparatus comprises means for transmitting, to a first apparatus, a configuration for use of a stored value of a power ramping counter for determining a transmission power of a random access transmission, the random access transmission being associated with a random access procedure initiated by a physical downlink control channel (PDCCH) order.

In some example embodiments, the second apparatus further comprises means for performing other operations in some example embodiments of the method 700 or the second apparatus 120. In some example embodiments, the means comprises at least one processor; and at least one memory storing instructions that, when executed by the at least one processor, cause the performance of the second apparatus.

Figure 8:
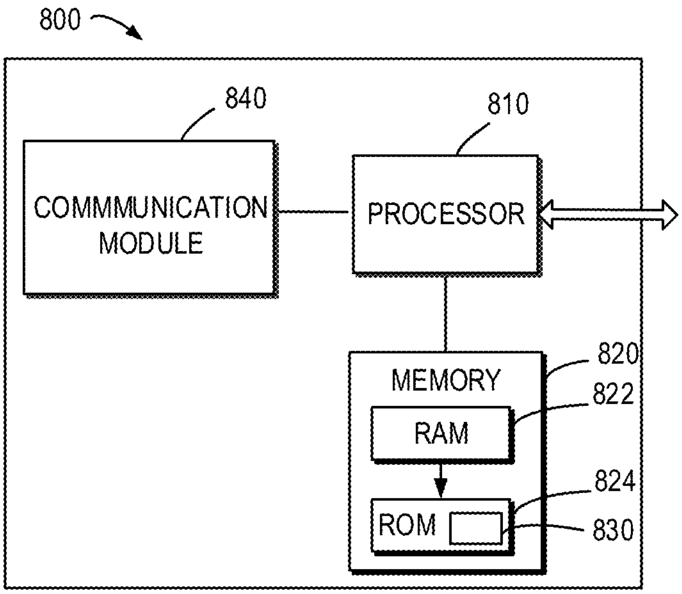
FIG. 8 illustrates a simplified block diagram of a device that is suitable for implementing example embodiments of the present disclosure.

FIG. 8 is a simplified block diagram of a device 800 that is suitable for implementing example embodiments of the present disclosure. The device 800 may be provided to implement a communication device, for example, the first apparatus 110 or the second apparatus 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The instructions of the program 830 may include instructions for performing operations/acts of some example embodiments of the present disclosure. The program 830 may be stored in the memory, e.g., the ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIG. 3 to FIG. 7. The example embodiments of the present disclosure may also be implemented by hardware or by a combination of software and hardware.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 9:
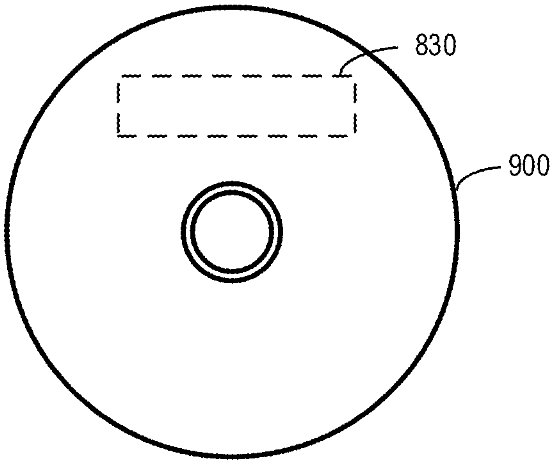
FIG. 9 illustrates a block diagram of an example computer readable medium in accordance with some example embodiments of the present disclosure.

FIG. 9 shows an example of the computer readable medium 900 which may be in form of CD, DVD or other optical storage disk. The computer readable medium 900 has the program 830 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:

at least one processor; and at least one memory storing instructions that, when executed by the at least one processor, cause the first apparatus to:

receiving a first physical downlink control channel (PDCCH) order from a second apparatus;

in response to receiving the first PDCCH order, perform a first random access transmission with a transmission power determined based on a power ramping counter, the first random access transmission being associated with a first random access procedure initiated by a PDCCH order;

receive a second PDCCH order indicating a second random access transmission without a random access response to a target reference signal of a candidate cell, the second random access transmission being subsequent to at least one random access transmission without a random access response to the target reference signal of the candidate cell performed in the first random access procedure;

in accordance with a determination that a second random access procedure is to be initiated:

store a value of the first power ramping counter associated with the first random access procedure; and perform the second random access transmission using a second transmission power determined based on the value of the first power ramping counter associated with the first random access procedure;

in response to performing the second random access procedure, reinitialize the value of the first power ramping counter;

receive a cell switch command indicating a switch from a serving cell currently serving the first apparatus to the candidate cell based on a third random access transmission; and perform the third random access transmission with a transmission power determined using the stored value of the first power ramping counter associated with the first random access procedure incremented by a predefined value.

2. The first apparatus of claim 1, wherein the first apparatus is further caused to:

in response to the second random access transmission being indicated as an initial random access transmission, perform the second random access transmission with the transmission power determined using the stored value of the first power ramping counter associated with the first random access procedure.

3. The first apparatus of claim 1, wherein the first apparatus is further caused to:

in response to the second random access transmission being indicated as a retransmission of the first random access transmission, perform the second random access transmission with the transmission power determined using one of:

the stored value of the first power ramping counter associated with the first random access procedure, a value of the power ramping counter generated by incrementing the stored value of the power ramping counter associated with the first random access procedure, a value of the power ramping counter generated by incrementing a default value of the power ramping counter, or a reset value of the first power ramping counter.

4. The first apparatus of claim 3, wherein the stored value of the first power ramping counter is associated with the candidate cell or the target reference signal of the candidate cell, wherein the random access transmission is performed to the candidate cell.

5. The first apparatus of claim 4, wherein the first power ramping counter is specific to a random access procedure without a random access response, the random access procedure being triggered by the PDCCH order.

6. The first apparatus of claim 5, wherein the first apparatus is caused to:

prioritize a random access resource having been for the first random access transmission.

7. The first apparatus of claim 6, wherein the first apparatus is further caused to:

receive, from a second apparatus, a configuration for use of the stored value of the first power ramping counter.

8. A system comprising:

a first apparatus:

at least one processor; and at least one memory storing instructions that, when executed by the at least one processor, cause the first apparatus to:

receiving a first physical downlink control channel (PDCCH) order from a second apparatus;

in response to receiving the first PDCCH order, perform a first random access transmission with a transmission power determined based on a power ramping counter, the first random access transmission being associated with a first random access procedure initiated by a PDCCH order;

receive a second PDCCH order indicating a second random access transmission without a random access response to a target reference signal of a candidate cell, the second random access transmission being subsequent to at least one random access transmission without a random access response to the target reference signal of the candidate cell performed in the first random access procedure;

in accordance with a determination that a second random access procedure is to be initiated:

store a value of the first power ramping counter associated with the first random access procedure; and perform the second random access transmission using a second transmission power determined based on the value of the first power ramping counter associated with the first random access procedure;

in response to performing the second random access procedure, reinitialize the value of the first power ramping counter;

receive a cell switch command indicating a switch from a serving cell currently serving the first apparatus to the candidate cell based on a third random access transmission; and perform the third random access transmission with a transmission power determined using the stored value of the first power ramping counter associated with the first random access procedure incremented by a predefined value.

9. The system of claim 8, wherein the first apparatus is further caused to:

in response to the second random access transmission being indicated as an initial random access transmission, perform the second random access transmission with the transmission power determined using the stored value of the first power ramping counter associated with the first random access procedure.

10. The system of claim 8, wherein the first apparatus is further caused to:

in response to the second random access transmission being indicated as a retransmission of the first random access transmission, perform the second random access transmission with the transmission power determined using one of:

the stored value of the first power ramping counter associated with the first random access procedure, a value of the power ramping counter generated by incrementing the stored value of the power ramping counter associated with the first random access procedure, a value of the power ramping counter generated by incrementing a default value of the power ramping counter, or a reset value of the first power ramping counter.

11. The system of claim 10, wherein the stored value of the first power ramping counter is associated with the candidate cell or the target reference signal of the candidate cell, wherein the random access transmission is performed to the candidate cell.

12. The system of claim 11, wherein the first power ramping counter is specific to a random access procedure without a random access response, the random access procedure being triggered by the PDCCH order.

13. The system of claim 12, wherein the first apparatus is caused to:

prioritize a random access resource having been for the first random access transmission.

14. The system of claim 13, wherein the first apparatus is further caused to:

receive, from a second apparatus, a configuration for use of the stored value of the first power ramping counter.

15. A method comprising:

receiving, by a first apparatus, a first physical downlink control channel (PDCCH) order from a second apparatus;

in response to receiving the first PDCCH order, performing a first random access transmission with a transmission power determined based on a power ramping counter, the first random access transmission being associated with a first random access procedure initiated by a PDCCH order;

receiving a second PDCCH order indicating a second random access transmission without a random access response to a target reference signal of a candidate cell, the second random access transmission being subsequent to at least one random access transmission without a random access response to the target reference signal of the candidate cell performed in the first random access procedure;

in accordance with a determination that a second random access procedure is to be initiated:

storing a value of the first power ramping counter associated with the first random access procedure; and performing the second random access transmission using a second transmission power determined based on the value of the first power ramping counter associated with the first random access procedure;

in response to performing the second random access procedure, reinitialize the value of the first power ramping counter;

receiving a cell switch command indicating a switch from a serving cell currently serving the first apparatus to the candidate cell based on a third random access transmission; and performing the third random access transmission with a transmission power determined using the stored value of the first power ramping counter associated with the first random access procedure incremented by a predefined value.

16. The method of claim 15, further comprising:

in response to the second random access transmission being indicated as an initial random access transmission, performing the second random access transmission with the transmission power determined using the stored value of the first power ramping counter associated with the first random access procedure.

17. The method of claim 15, further comprising:

in response to the second random access transmission being indicated as a retransmission of the first random access transmission, performing the second random access transmission with the transmission power determined using one of:

the stored value of the first power ramping counter associated with the first random access procedure, a value of the power ramping counter generated by incrementing the stored value of the power ramping counter associated with the first random access procedure, a value of the power ramping counter generated by incrementing a default value of the power ramping counter, or a reset value of the first power ramping counter.

18. The method of claim 17, wherein the stored value of the first power ramping counter is associated with the candidate cell or the target reference signal of the candidate cell, wherein the random access transmission is performed to the candidate cell.

19. The method of claim 18, wherein the first power ramping counter is specific to a random access procedure without a random access response, the random access procedure being triggered by the PDCCH order.

20. The method of claim 19, further comprising:
prioritizing a random access resource having been for the first random access transmission.

* * * * *